Jan. 3, 1961  A. M. DOUDLAH  2,966,743
GONIOMETER

Filed April 23, 1958  2 Sheets-Sheet 1

INVENTOR.
ANNA M. DOUDLAH

BY

ATTORNEYS

Jan. 3, 1961 A. M. DOUDLAH 2,966,743
GONIOMETER

Filed April 23, 1958 2 Sheets-Sheet 2

INVENTOR.
ANNA M. DOUDLAH

BY

ATTORNEYS

United States Patent Office 2,966,743
Patented Jan. 3, 1961

2,966,743
GONIOMETER
Anna M. Doudlah, Brooklyn, Wis.
(Wm. Beaumont Army Hospital, Box 223, El Paso, Tex.)
Filed Apr. 23, 1958, Ser. No. 730,502
3 Claims. (Cl. 33—1)
(Granted under Title 35, U.S. Code (1952), sec. 266)

The invention described herein may be manufactured and used by or for the Government for governmental purposes without the payment of any royalty thereon.

The present invention relates to a goniometer especially designed for measurement of joint ranges and of particular utility in connection with the treatment of physically disabled persons, physical therapy and occupational therapy treatment.

One of the objects of this invention is to provide an instrument of simple construction, being light in weight, easily manipulated and convenient to use.

Another object is to afford consistent and accurate measurements of the same joint by two or more different people who operate the device by eliminating the factor of parallax.

A further object of the invention is to permit the exact location of the functional axis of the joint being measured.

Further objects and a more complete understanding of the invention may be obtained by referring to the following description and claims taken in conjunction with the accompanying drawings which show an illustrative embodiment of the construction forming the basis of the invention and in which—

Figure 1:
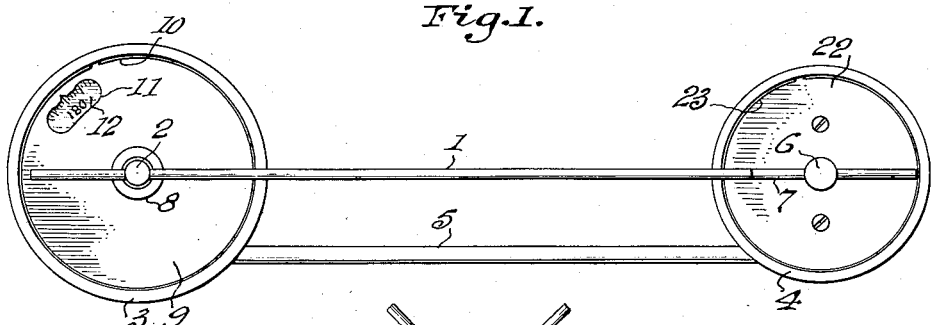
Figure 2:
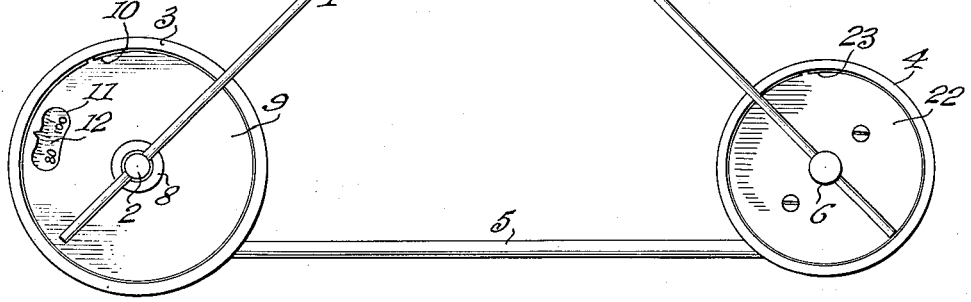
Figure 3:
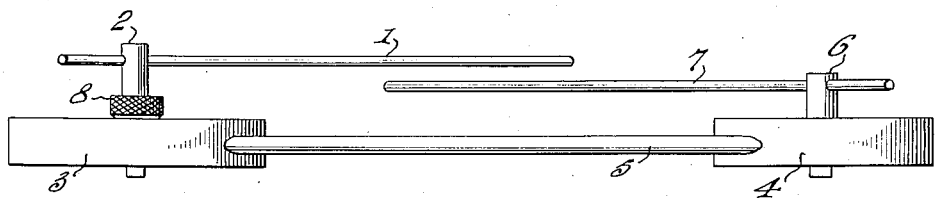
Figure 4:
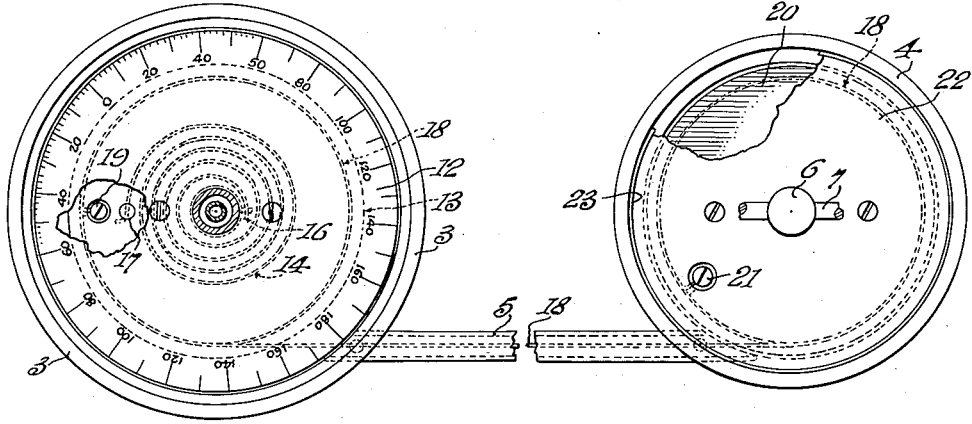
Figure 5:
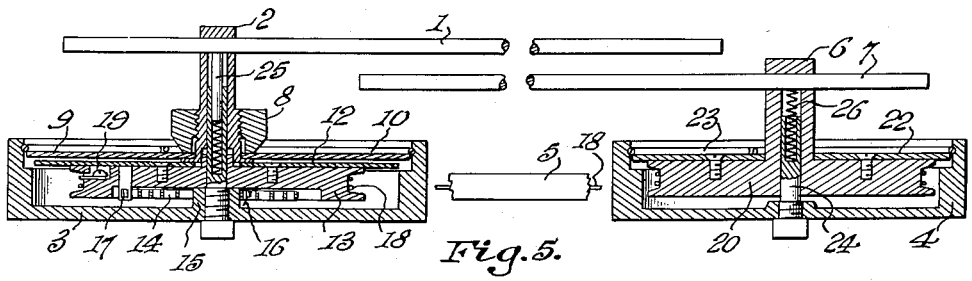

Fig. 1 shows the device measuring a 180 degree angle;
Fig. 2 shows the device measuring a 90 degree angle;
Fig. 3 is a front elevation view of Fig. 2;
Fig. 4 is a top view in detail of the two housing members and the connection between them;
Fig. 5 is a central vertical sectional view of the two housing members; and
Fig. 6 is a front elevation of the device with partial cutaway views of the housing members showing the winding spool arrangement.

Referring to Figs. 1, 2, and 3, rod 1 is inserted into shaft 2 which is mounted in housing 3. Housing 3 is connected to housing 4 by hollow tube 5. In housing 4 is mounted shaft 6 into which is inserted rod 7. Rods 1 and 7 are slidably adjustable in their respective shafts 2 and 6. Adjusting nut 8 threadably engages shaft 2 and when tightened causes engagement between shaft 2 and plate 9.

Figure 6:
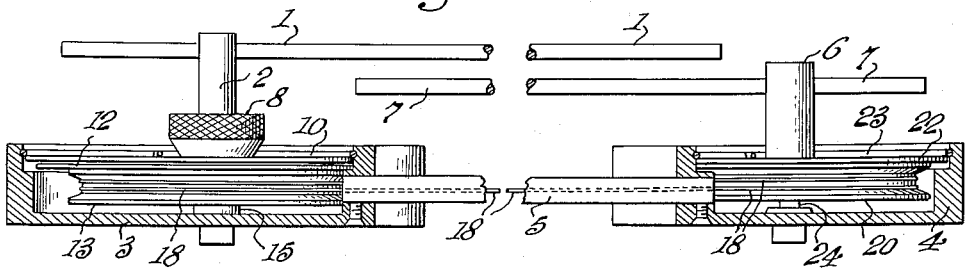

Referring to Figs. 4, 5, and 6, plate 9 is held in position by snap spring 10 and rotates about shaft 2 with indicating window 11 (Figs. 1 and 2) revealing the readings of dial 12 located underneath. Dial 12 is calibrated from 0 to 180 to 0 degrees (Fig. 4) and is affixed to spool 13. Spring 14 coils about hub 15 and is fastened to hub 15 at 16 and to spool 13 at 17. Cord 18 is fastened to spool 13 by screw 19, encircles spool 13 a few turns, passes through hollow tube 5, encircles spool 20 a few turns, and is fastened to spool 20 at 21. Spool 13 is caused to rotate about shaft 2 in one direction by coil spring 14 and in the other direction by cord 18. Spool 20 and shaft 6 are one piece and rotate about axle 24. Cover plate 22 is affixed to spool 20 and is held in place in housing 4 by snap spring 23.

In its operation, the two rods 1 and 7 are aligned on top of each other as in Fig. 1 and the dial 12 and plate 9 adjusted by means of adjusting nut 8 so that 180 degrees is indicated in window 11. After adjustment, the adjusting nut 8 is firmly tightened. The device is then placed near the joint which is to be measured. Rods 1 and 7 are aligned along the bones forming the joint so that the angle being measured is angle A in Fig. 2, and the reading appears on the dial through indicating window 11. Since the dial 12 is calibrated from 0 to 180 to 0 degrees, the rods 1 and 7 may be moved to one side or the other of hollow tube 5 and the angle will be indicated in the same manner. As rod 1 is moved in alignment with one of the bones forming the angle to be measured, shaft 2 is rotated causing adjusting nut 8 and plate 9 with indicating window 11 to be rotated a corresponding amount. As rod 7 is moved in alignment with the other bone forming the angle to be measured, shaft 6, spool 20 and plate 22 rotate about axle 24. If rod 7 is moved downward from its position in Fig. 1, cord 18 is caused to wind around spool 20 thereby rotating spool 13 counterclockwise and dial 12 a corresponding amount in the same direction. If rod 7 is moved upward to a position as in Fig. 2, coil spring 14 causes spool 13 and dial 12 to rotate clockwise a corresponding amount.

Rods 1 and 7 are slidably adjustable in their respective shafts 2 and 6 and are held in position by spring-actuated piston 25 in shaft 2 and spring 26 in shaft 7. After rods 1 and 7 are aligned with the bones forming the angle being measured, the rods may be slidably adjusted until they intersect. The point of intersection indicates the functional axis of the joint being measured.

Although a preferred form of this invention has been described, the principles herein taught may be embodied in other forms of construction within the scope of this invention. For example, such forms may use as coacting and interconnecting means between spools 13 and 20 an endless belt arrangement or rod and gear arrangement, as are well known in the art; or if angle B or C (Fig. 2) is the angle desired to be indicated on the dial, another set of dial numbers may be placed on the same dial or a set of interchangeable dials may be used, such calibration of the dial being well known in the art; or the dial may be covered by a transparent material having an index thereon; or the means indicating the reading of the dial may be a simple pointer. The device could also be used to measure angles of inclination and declination by aligning the first rod in the horizontal plane and sighting along the second rod for the inclination or declination.

I claim:
1. A goniometer comprising in combination a pair of spaced interconnected housings, a pair of rods capable of intersecting each other, each one of said pair of rods being slidably and rotatably carried by a housing, each rod being capable of alignment with a side of an angle being measured, a pair of spools, one of said spools being mounted in each housing, means interconnecting said spools for coaction therebetween, a first one of said rods being connected to a first one of said spools, winding and unwinding means associated with said spools, a dial connected to a second one of said pair of spools, a second one of said rods being carried by a second one of said housings, and means cooperating with said dial and said second rod for indicating the angle between said pair of rods.

2. A goniometer comprising in combination a pair of spaced interconnected housings, a pair of rods capable of intersecting each other, each one of said pair of rods being slidably and rotatably mounted on a housing, each rod being capable of alignment with a side of an angle being measured, a pair of spools, one of said spools being mounted in each housing, a first one of said rods connected to a first one of said spools, winding means connected to a second one of said spools and means for unwinding said second spool and interconnecting said first and second spools, a dial connected to a second one of said spools for indicating angles between said intersecting rods, a cover plate provided with an opening above said dial and having index means adjacent to said opening, and a second one of said rods connected to said cover plate for rotation of said cover plate relative to said dial to indicate the angle between said rods.

3. A goniometer comprising in combination a pair of housing members, a hollow member rigidly interconnecting said housings, first and second coacting spools, said first spool having a central shaft rotatably mounted in a first one of said pair of housings, said second spool rotatably mounted in a second one of said pair of housings, biasing means connected to said second spool to impart a winding action thereto, means for unwinding said second spool and interconnecting said spools through said hollow interconnecting member, a pair of rods capable of intersecting each other, each rod capable of being aligned with a side of an angle being measured, a first one of said pair of rods slidably mounted on said central shaft, means for slidably mounting a second one of said pair of rods on the second one of said pair of housings for rotation independently of said second spool, a dial connected to the second one of said pair of spools, a cover plate provided with an opening above said dial and having index means adjacent said opening for indicating the angle between said rods, and means for rotating said cover plate relative to said dial by the second one of said pair of rods.

References Cited in the file of this patent
UNITED STATES PATENTS

| | | |
|---|---|---|
| 600,438 | Moran | Mar. 8, 1898 |
| 1,408,504 | Hammond | Mar. 7, 1922 |
| 1,466,416 | Whitaker | Aug. 28, 1923 |
| 2,116,625 | Grant | May 10, 1938 |
| 2,363,948 | Dugan | Nov. 28, 1944 |
| 2,569,890 | Hicks | Oct. 2, 1951 |
| 2,718,063 | Ike | Sept. 20, 1955 |